United States Patent
Moshaiov et al.

(10) Patent No.: US 6,256,634 B1
(45) Date of Patent: Jul. 3, 2001

(54) METHOD AND SYSTEM FOR PURGING TOMBSTONES FOR DELETED DATA ITEMS IN A REPLICATED DATABASE

(75) Inventors: Lior Moshaiov, Tel Aviv; Ronit Hartmann, Haifa, both of (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/107,719

(22) Filed: Jun. 30, 1998

(51) Int. Cl.$^7$ .................................................. G06F 17/30
(52) U.S. Cl. ..................... 707/100; 707/101; 707/202; 707/206; 709/203; 709/208
(58) Field of Search .................... 707/101, 202, 707/206; 709/203, 208

(56) References Cited

U.S. PATENT DOCUMENTS

| | | | |
|---|---|---|---|
| 4,499,576 | 2/1985 | Fraser | 370/412 |
| 4,584,679 | 4/1986 | Livingston et al. | 714/749 |
| 4,623,886 | 11/1986 | Livingston | 340/825.5 |
| 4,736,369 | 4/1988 | Barzilai et al. | 370/231 |
| 4,769,815 | 9/1988 | Hinch et al. | 370/236 |
| 4,853,842 | * 8/1989 | Thatte et al. | 707/206 |
| 5,063,562 | 11/1991 | Barzilai et al. | 370/231 |
| 5,163,131 | 11/1992 | Row et al. | 709/202 |
| 5,247,676 | 9/1993 | Ozur et al. | 709/328 |
| 5,285,445 | 2/1994 | Lehnert et al. | 370/413 |
| 5,287,103 | 2/1994 | Kasprzyk et al. | 340/825.52 |
| 5,367,523 | 11/1994 | Chang et al. | 370/235 |
| 5,526,358 | 6/1996 | Gregerson et al. | 709/221 |
| 5,526,489 | 6/1996 | Nilakantan et al. | 709/228 |
| 5,557,748 | 9/1996 | Norris | 709/220 |
| 5,572,522 | 11/1996 | Calamvokis et al. | 370/390 |
| 5,572,582 | 11/1996 | Riddle | 379/252 |
| 5,689,706 | * 11/1997 | Rao et al. | 707/8 |
| 5,758,184 | 5/1998 | Lucovsky et al. | 710/6 |
| 5,761,507 | 6/1998 | Govett | 709/101 |
| 5,764,625 | 6/1998 | Bournas | 370/231 |
| 5,777,987 | 7/1998 | Adams et al. | 370/336 |
| 5,778,384 | 7/1998 | Provino et al. | 707/200 |
| 5,799,321 | * 8/1998 | Benson | 707/201 |

(List continued on next page.)

OTHER PUBLICATIONS

Hornick and Zdonik, "A Shared, Segmented Memory System for an Object–Oriented Database", ACM Transaction on Office Information Systems, vol. 5, No. 1, pp. 70–95, Jan. 1987.*

(List continued on next page.)

*Primary Examiner*—John Breene
*Assistant Examiner*—Cheryl Lewis
(74) *Attorney, Agent, or Firm*—Leydig, Voit & Mayer Ltd.

(57) ABSTRACT

A method and system coordinates the purging of tombstones for data items deleted from a directory service database of a message queuing system. The directory service database is a replicated database with a plurality of servers, and the data items owned by one server are replicated by all other servers in the system. The directory service database supports a synchronization mechanism for a slave server to request for replication data from a master server. To support the synchronization mechanism, a tombstone is set up each time a server deletes a data item from its local database. For a slave server of a first type, the master server purges the tombstone after receiving an acknowledgment from the slave server for receipt of replication information regarding the deletion. For a slave server of a second type, the master server purges the tombstone after the tombstone has become sufficiently aged. If the slave server of the second type fails to receive the replication data and makes a synchronization request for a range of write operations including the deletion and the master server has already purged the tombstone for the deleted item, a full synchronization is performed between the master and slave servers such that the slave server reconstructs a fresh copy of data items currently in the database of the master server.

22 Claims, 8 Drawing Sheets

U.S. PATENT DOCUMENTS

| | | | |
|---|---|---|---|
| 5,806,065 | * | 9/1998 | Lomet ..................................... 707/8 |
| 5,812,773 | * | 9/1998 | Norin ............................. 395/200.34 |
| 5,812,819 | | 9/1998 | Rodwin et al. ........................ 703/23 |
| 5,815,667 | | 9/1998 | Chien et al. ......................... 709/232 |
| 5,819,042 | | 10/1998 | Hansen ................................ 709/222 |
| 5,819,272 | * | 10/1998 | Benson .................................... 707/8 |
| 5,832,514 | * | 11/1998 | Norin et al. ......................... 707/202 |
| 5,835,727 | | 11/1998 | Wong et al. ......................... 709/238 |
| 5,838,907 | | 11/1998 | Hansen ................................ 709/220 |
| 5,845,081 | | 12/1998 | Rangarajan et al. ................ 709/224 |
| 5,854,901 | | 12/1998 | Cole et al. ........................... 709/245 |
| 5,864,669 | | 1/1999 | Osterman et al. ................... 709/203 |
| 5,872,968 | | 2/1999 | Knox et al. ............................. 713/2 |
| 5,875,301 | | 2/1999 | Duckwall et al. ...................... 710/8 |
| 5,875,306 | | 2/1999 | Bereiter ............................... 709/220 |
| 5,881,051 | | 3/1999 | Arrowood et al. .................. 370/248 |
| 5,887,275 | * | 3/1999 | Nguyen et al. ...................... 711/206 |
| 5,901,138 | | 5/1999 | Bader et al. ......................... 370/229 |
| 5,920,697 | | 7/1999 | Masters et al. ...................... 709/219 |
| 5,922,049 | | 7/1999 | Radia et al. ......................... 709/220 |
| 5,956,340 | | 9/1999 | Afek et al. ........................... 370/412 |
| 6,012,059 | * | 1/2000 | Neimat et al. ........................... 707/8 |

OTHER PUBLICATIONS

Chawathe et al., "Change Detection in Hierarchically Structured Information", ACM, pp. 493–504, Jun. 1996.*

Blakeley et al., *Messaging and Queuing Using the MQI*, McGraw Hill, Inc.; New York, NY, Jan. 1995.

Douglas E. Comer, *Interneting with TCP/IP, vol. 1: Principles, Protocols and Architecture, Second Edition*, Chapter 19, Jan. 1991.

Andrew S. Tanenbaum, *Computer Networks, Third Edition*, Prentice Hall, New Jersey; pp. 577–622; Jan. 1996.

*Microsoft Message Queuing Services: A Guide to Reviewing Microsoft Message Queuing Service Release 1.0*, Microsoft Corporation, Redmond, Washington, Jan. 1997.

Comer, Douglas E., *Internetworking With TCP/IP vol. 1: Principles, Protocols, and Architecture*, Chapter 6: Determining an Internet Address at Startup (RARP) and Chapter 18: Client–Server Model of Interaction, pp. 83–88, 293–309, Prentice–Hall, Englewood Cliffs, New Jersey, Jan. 1991.

Benaloh, Josh et al, *The Private Communication Techonology (PCT) Protocol*, Internet Draft, available from http://premium.microsoft.com/msdn/library/bkgrnd/html/pct/hml, Oct., 1995.

Marshall, Martin, "Microsoft Updates Falcon Beta", *Internetweek*, Issue 653, Mar. 10, 1997.

Bowen, Ted Smalley, "Asynchronous Messaging Pushes to the Fore", *Infoworld*, Feb. 23, 1998. Available from http://www.infoworld.com/cgi–bin/displayTC.pl?/980223sbl–async.htm.

Biggs, Maggie, "Applications Released from Platform Confines: Message Queuing Exchanges Data Between Apps Regardless of Platform", *Infoworld*, Feb. 23, 1998. Available from http://infoworld.com/cgi–bin/displayTC.pl?/980223analysis.htm.

*Using MSMQ as an RPC Transport*, Microsoft Corporation, Jan. 1997.

Tarjan, Robert Endre, *Data Structures and Network Algorithms*, Chapter 3: Heaps, pp. 33–43, Society for Industrial and Applied Mathematics, Philadelphia, Pennsylvania, Jan. 1993.

*Microsoft Message Queue Server 1.0 Release Notes*, Microsoft Corporation, Redmond Washington, Jan. 1997.

*Microsoft Message Queue Server: A Guide to Reviewing and Evaluation Microsoft Message Queue Server Beta 2 Release*, Microsoft Corporation, Redmond, Washington, Jan. 1997.

Richter, Jeffrey, *Advanced Windows: The Professional Developers Guide to the Win32 API for Windows NT 4.0 and Windows 95*, Chapter 11: Window Messages and Asynchronous Input, pp. 461–528, Microsoft Press, Redmond, Washington, Jan. 1997.

Sinha, Alok K., *Network Programming in Windows NT*, Chapter 5: Windows Sockets in Windows NT, pp. 199–299, Addison–Wesley Publishing Company, Reading, Massachusetts, Jan. 1996.

Gilman, Len and Schreiber, Richard, *Distributed Computing with IBM MQSeries*, John Wiley & Sons, New York, New York, Jan. 1997.

Blakeley, Burnie; Harris, Harry, and Lewis, Rhys, *Messaging & Queuing Using the MQI*, McGraw–Hill Inc., New York, New York, Jan. 1995.

* cited by examiner

FIG. 4

| SN | OPER. | OBJECT |
|----|-------|--------|
| 1  | CR    | Q1 |
| 2  | CR    | Q2 |
| 3  | CR    | Q3 |
| 4  | CR    | Q4 |
| 5  | CR    | Q5 |
| 6  | SET   | Q2 |
| 7  | SET   | Q4 |
| 8  | SET   | Q5 |
| 9  | SET   | Q3 |
| 10 | SET   | Q2 |
| 11 | DEL   | Q3 |
| 12 | SET   | Q5 |
| 13 | CR    | Q6 |
| 14 | SET   | Q1 |
| 15 | CR    | Q7 |
| 16 | DEL   | Q4 |
| 17 | SET   | Q1 |

FIG. 5

DELETION TABLE (PSC2)

| guidMasterId | guidObject | SN | Time_Stamp |
|--------------|------------|----|------------|
| (PSC1) | (Q3) | 11 | (local time 1) |
| (PSC1) | (Q4) | 16 | (local time 2) |

FIG. 7

PSC_ACK.

BASIC HEADER guidPSCMasterId
guidAckedMasterId
SEQNUM

FIG. 8

HELLO

BASIC HEADER

PathName
MasterCount guidMasterId
snLSN
snPurged

FIG. 9

SYNC_REQUEST

BASIC HEADER guidMasterId
snFrom
snTo
snKnownPurged
uclsFullSync

FIG. 10

SYNC_REPLY

BASIC HEADER guidMasterId
snFrom
snTo
UpdateCount
CompleteFullSync

| PURGE TABLE (PSC1) | | | | | |
|---|---|---|---|---|---|
| guidMasterId | snMasterPurged | snPurged | snAcked | snAckedPEC | SYNC_STATE |
| (PSC1) | 13 | 13 | 17 | | |
| (PSC2) | — | — | 13 | | Normal |

METHOD AND SYSTEM FOR PURGING TOMBSTONES FOR DELETED DATA ITEMS IN A REPLICATED DATABASE

FIELD OF THE INVENTION

This invention relates generally to a replicated database, and more particularly to the replication of data items in a replicated database, such as one used in a message queuing system for providing directory service.

BACKGROUND OF THE INVENTION

A message queuing system implements asynchronous communications which enable applications in a distributed processing network to send messages to, and receive messages from, other applications. A message may contain data in any format that is understood by both the sending and receiving applications. When the receiving application receives a request message, it processes the request according to the content of the message and, if required, sends a response message back to the original sending application. The sending and receiving applications may be on the same machine or on separate machines connected by a network. While in transit between the sending and receiving applications, the message queuing system keeps messages in holding areas called message queues. The message queues protect messages from being lost in transit and provide a place for an application to look for messages sent to it when it is ready.

In a proposed message queuing system, a replicated database is maintained for providing directory service for message queuing and routing operations. This directory service database includes a plurality of local databases maintained by respective directory servers on different machines. Each directory server maintains not only data items created by itself but also a replica of data items created by all other servers in the directory service database. When a server creates, modifies, or deletes its data items, it sends replication message packets to the other servers so that they can update their respective replicas. In the context of data replication, a server sending replication information is referred to as a "master," and a server receiving the replication information is referred to as a "slave." If a slave server learns or suspects that it has not received all of the replication information from a master server, it sends a synchronization request to the master server to obtain the missing replication information. To support the synchronization operation, when a server deletes a data item from its local database, it sets up a tombstone to memorialize the deletion so that the deletion can be replicated by other servers. As the configuration of the message queuing system changes over time, data items representing message queuing objects, such as message queues, are constantly created and deleted. With more and more data items deleted from the directory service, the number of tombstones increases correspondingly. Without an effective way to purge the tombstones, the tombstones may grow in an unbounded way and ultimately may fill up the memory space of the directory service database. On the other hand, if the tombstones are purged prematurely, i.e., before other servers have learned about the deletion, the synchronization operation cannot be performed properly.

SUMMARY OF THE INVENTION

In accordance with the present invention, there is provided a method and system for purging tombstones for deleted data items in a replicated database in which data items owned by one server are replicated by other servers. When a master server in the replicated database deletes a data item from its local database, it sets up a tombstone for the deleted data item and sends replication data regarding the deletion to one or more slave servers each of which maintains a replica of the master server's data items. The timing for purging the tombstone by the master server depends on the types of the slave servers receiving the replication data. For a slave server of a first type, the tombstone is purged only after the master server has received an acknowledgment from the slave server for receipt of the replication data regarding the deletion. For a slave server of a second type, the master server purges the tombstone after the tombstone has become sufficiently aged, without requiring the slave server to acknowledge that it has received the replication data regarding the deletion. In the event that the slave server fails to receive the replication data regarding the deletion and later requests for a synchronization to update its replica when the master has already purged the tombstone for the deletion, the master server cooperates with the slave server to perform a full synchronization to completely reconstruct the slave server's replica of data items of the master server. Efficient full synchronization methods are provided to enable the slave server to continue to serve read requests for the data items being updated during the full synchronization process.

Other advantages will become apparent with reference to the following detailed description when taken in conjunction with the drawings in which:

BRIEF DESCRIPTION OF THE DRAWINGS

FIG. 4 is an exemplary numbered sequence of write operations performed by a server in the replicated database;

FIG. 5 is a schematic diagram showing a deletion table containing deletion records (tombstones) for deleted data items;

FIG. 7 is a schematic diagram showing an acknowledgment packet for receipt of replication data;

FIG. 8 is a schematic diagram showing a Hello packet sent by a master server to a slave server;

FIG. 9 is a schematic diagram showing a packet for requesting a synchronization operation;

FIG. 10 is a schematic diagram showing a packet for replying to a synchronization request;

FIG. 11 is a schematic diagram showing a purge table maintained by a server for managing the purging of tombstones for deleted data items;

Figure 1:
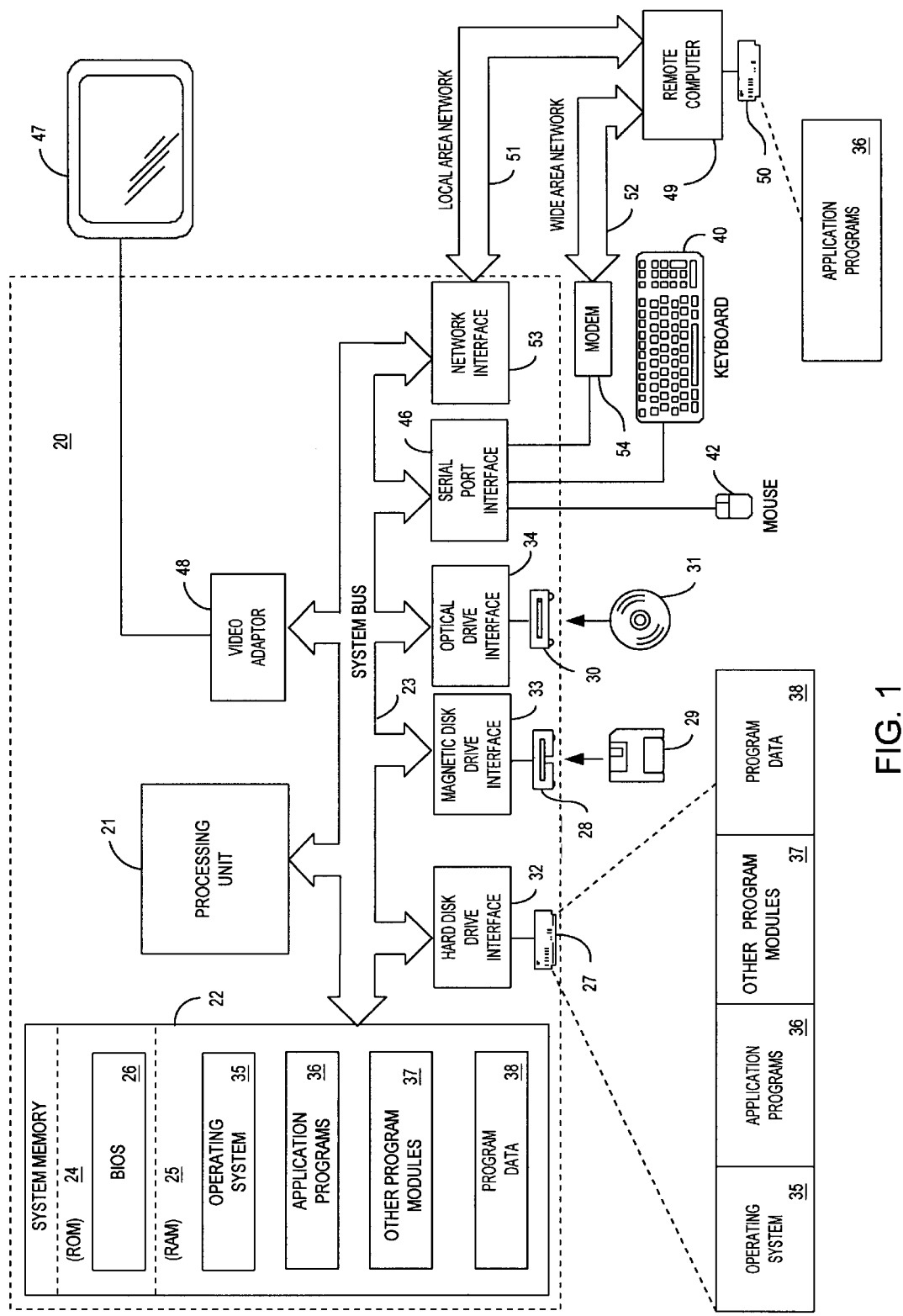
FIG. 1 is a block diagram of a computer system that may be used to implement a method and system for purging tombstones in a replicated database according to the invention.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the intention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 and the following discussion are intended to provide a brief, general, description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. The local network 51 may be part of a larger Wide Area Network, in which local area networks are interconnected via routers or bridges. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention is directed to the purging of tombstones for deleted items in a replicated database in which data items owned by one server are replicated by other servers in the replicated database. In a preferred embodiment, the replicated database is a directory service database used in a message queuing system. It will be appreciated, however, that the invention is applicable to other types of replicated database systems used in different contexts or environments.

Figure 2:
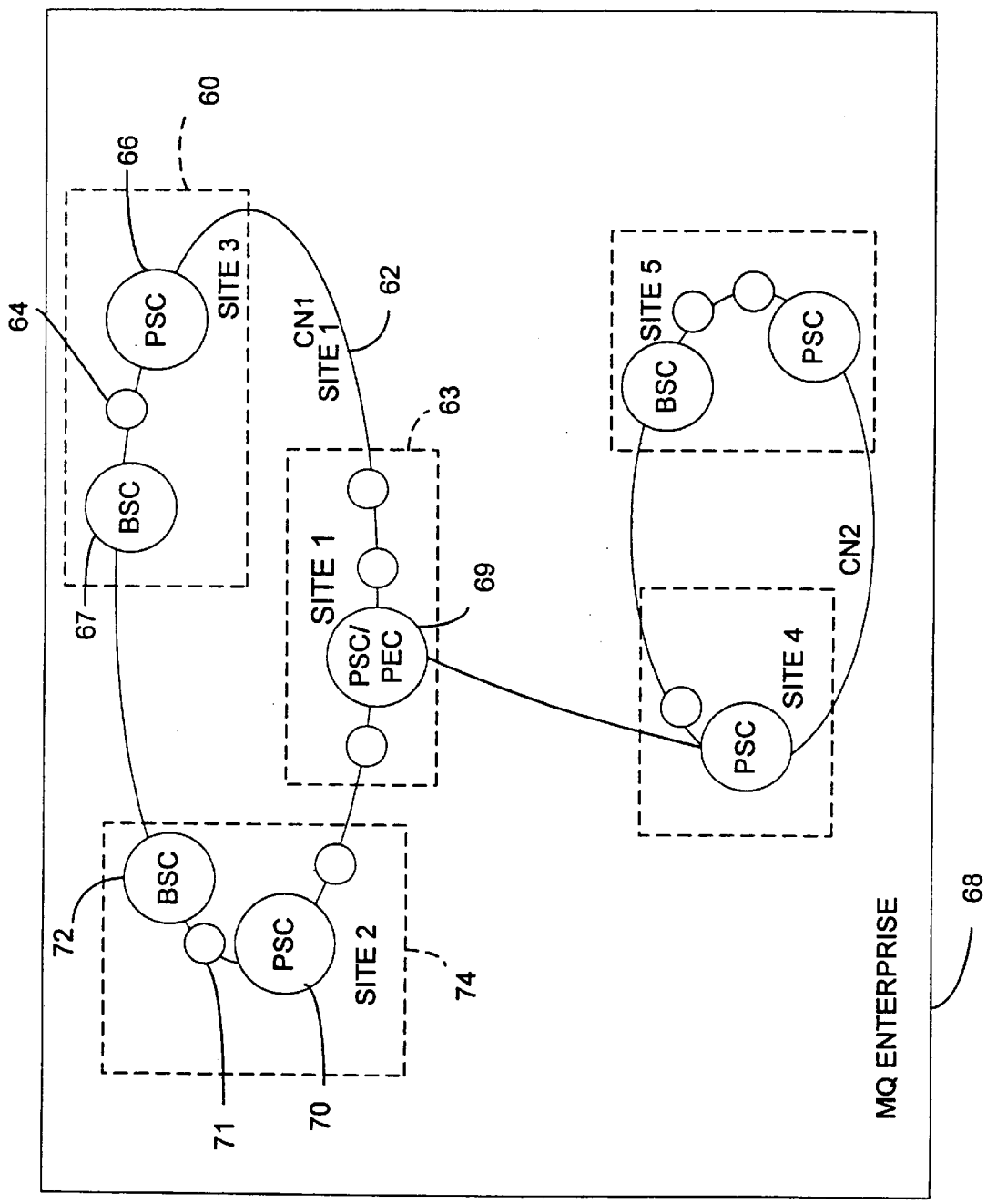
FIG. 2 is a schematic diagram showing the architecture of a message queuing system with a replicated database for providing directory service.

FIG. 2 shows an exemplary architecture of a message queuing system for supporting asynchronous communications between applications. In this message queuing system, the grouping of the computers includes three logic levels. The grouping on one level is called a "Site." The computers belonging to a Site typically are networked with fast links to enable high-speed communications among the computers. Within each Site, one or more computers have a message queuing (MQ) server for handling the message delivery and queuing operations. Some computers in a Site may not have its own MQ server but rather function as clients to use the MQ server of another computer for message queuing functionality. The computers in a Site are not required to be able to form direct sessions with each other as long as they can communicate through a MQ server in the Site.

On another level, a group of computers form a "Connected Network" (CN) if each two computers in the group can establish direct communication sessions. The computers in a Connected Network need not be at the same locality and may include computers belonging to different Sites. On another level, the collection of all interconnected Connected Networks and Sites forms a message queuing "Enterprise."

To provide directory information used in message sending and routing operations and for other functions such as message security, the message queuing system includes a directory service database which is referred to hereinafter as the "Message Queuing Information System" (MQIS). The MQIS is a replicated database for storing information regarding the topology and settings of the Enterprise, computers, and message queues, etc. To that end, the MQIS creates and maintains data items representing different objects involved in the message delivery and queuing operations, such as message queues, machines, Sites, Connected Networks and the Enterprise.

The MQIS includes a plurality of directory servers distributed at different Sites of the MQ Enterprise 68. More particularly, each Site is provided with a directory server called "Primary Site Controller" (PSC). A PSC is responsible for creating and maintaining data items representing MQ objects within its Site, including machines and message queues in the Site. One of the PSCs in the MQ Enterprise also serves as a "Primary Enterprise Controller" (PEC) 69 for creating and maintaining data items representing Users, Connected Networks (CNs), Sites, Site Links, and the Enterprise 68. Besides the data items it has created for its Site, each PSC also maintains a replica of data items created by the PEC 69 and all other PSCs for their respective Sites. Each Site may also include one or more directory servers called "Backup Site Controllers" (BSCs). Each BSC maintains a copy of all data items maintained by the PSC of its Site, including the data items created by the PSC of its Site and the replica of data items created by the PEC and all other PSCs. Thus, the data items created and maintained by one MQIS server are replicated by all other servers in the Enterprise. In this respect, data replication in the MQIS has no "scope," i.e., there is no requirement that certain data are to be replicated only by selected servers. It will be appreciated, however, that the method of purging tombstones according to the invention may be implemented in a replicated database which supports scopes of data replication.

In a preferred embodiment, the MQIS is a "singlemaster" replicated database in the sense that each data item has a particular owner. The data items for computers and queues in a Site are owned by that Site, and data items such as Enterprise, Sites, Site links, CNs, and Users are owned by the PEC. Only the owner of a data item can create, modify or delete the master copy of that data item. This singlemaster concept should not be confused with the "masterslave" relationship between two servers in the context of data replication which will be described in greater detail below.

By way of example, in the MQ Enterprise topology illustrated in FIG. 2, the local MQIS database on the PEC 69, which is also the PSC of the Site 63, contains the master copy of data items for the Enterprise, Sites, Site links, Users, and CN settings, and the master copy of the data items for the Site 63. It also contains replicated data owned by all other Sites. The local database on the PSC 70 of the Site 74 contains the master copy of the data items for the computers and queues of the Site 74 and replicated data items owned by all other Sites and the PEC. The BSC 72 of the Site 74 does not own any data item but contains a replica of all data items contained in the PSC 70.

When an application running on a computer 64 in the Site 60 makes a request to create a message queue on a target computer 71 in another Site 74, the request is transferred to the PSC 70 of the Site of the target computer. The PSC 70 in response creates a data item for that message queue, and the newly created data item is replicated by all other servers in the Enterprise 68. Only the PSC 70 which has created the data item can later modify or delete it. The modification or deletion is then replicated by other directory servers in the MQ Enterprise 68. When an application wants to send to or read from a message queue, the message queuing system sends read requests for the data item for the message queue to any MQIS server (PSC or BSC) in the local Site to locate the queue. The message queuing system then obtains from the MQIS server the location and other information regarding the machine maintaining the message queue. Based on the directory information from the MQIS, a routing decision is made.

The spanning tree of the data replication in the MQIS is such that a PSC (or PEC) sends replication data regarding its own data items to all other PSCs and the BSCs in its Site, and each of the receiving PSCs forwards the replication data it has received to the BSCs in its Site. More particularly, to enable the other PSCs to update their replicas of its data items, a PSC (or the PEC) periodically sends replication message packets to other PSCs in the Enterprise 68 regarding write operations it has recently performed on its data items. The term "write operation" is used broadly herein to include any operation performed by the server that changes the database contents, such as creating, modifying, or deleting a data item. Each PSC also sends replication packets regarding write operations performed by itself and all other PSCs to the BSC(s) in its Site. Because of the time delays for the replication information to propagate across the network, at any given time there may be discrepancies between the contents of the local databases maintained by the individual directory servers in the Enterprise.

Figure 3:
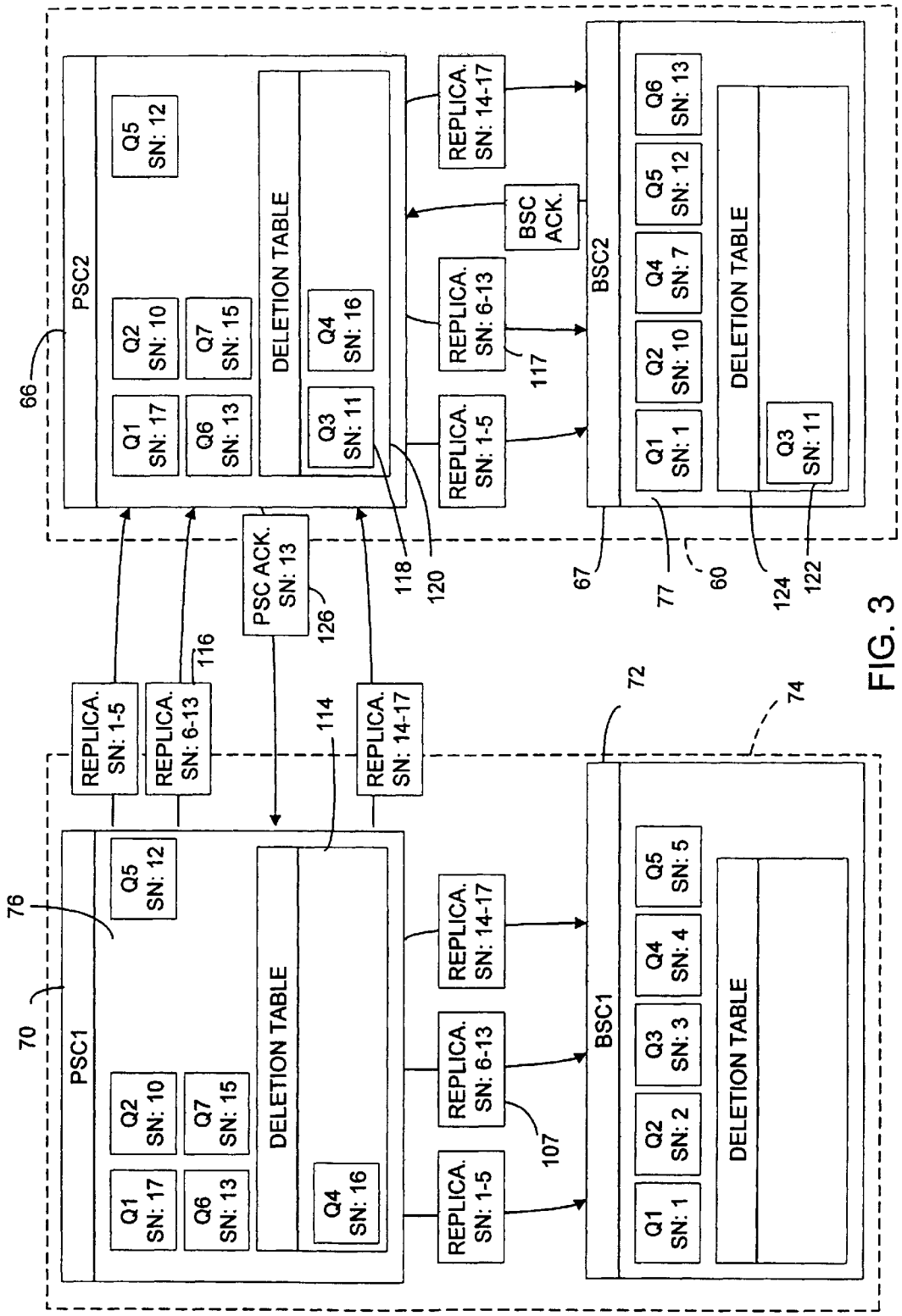
FIG. 3 is a schematic diagram showing servers in the replicated database connected for data replication and synchronization operations.

The replication of write operations in the MQIS is now described by way of example in reference to FIGS. 3 and 4. For simplicity and clarity of description, the illustrated example focuses on data items for message queues, and only two PSCs and their associated BSCs are shown in FIG. 3 to illustrate the data replication process. It will be appreciated, however, the same replication process is used when more PSCs and BSCs and other types of message queuing objects are involved in the data replication. Also for simplicity and clarity of description, only the message queue data items created by the PSC 70 and the replicas thereof maintained by the other servers are illustrated in FIG. 3.

The PSC 70, as illustrated in FIG. 3, has created in its local database 76 a plurality of data items (Q1–Q7) for message queues in its Site 74. The data items created by the PSC 70 are replicated by another PSC 66 in its own local database. The PSC 70 likewise maintains a replica (not shown) of the data items (not shown) created by the PSC 66. A BSC 72 in the Site 74 of the PSC 70 maintains a replica of all data items maintained by the PSC in its local database 76, including data items owned by the PSC and other PSCs in the system, such as the PSC 66. Similarly, a BSC 67 in the Site 60 of the PSC 66 maintains a replica of the data items maintained by the PSC 66 in its local database 77.

For managing the replication of data items throughout the MQ Enterprise, each write operation performed by a PSC server on its own data items is assigned a sequence number unique to that server for identifying the write operation. FIG. 4 shows an exemplary numbered sequence 80 of write operations performed by the PSC 70 that results in the message queue data items in the local database 76 of the PSC 70 as illustrated in FIG. 3. Three types of write operations are shown in the illustrated sequence: the "CREATE" operation creates a new data item, the "SET" operation modifies the values and/or properties in an existing data item, and the "DELETE" operation deletes a data item from the database. In the illustrated sequence in FIG. 4, message queue data items Q1 through Q7 are created at sequence numbers 1–5, 13 and 15, respectively, and the data items Q3 and Q4 are then deleted at sequence numbers 11 and 16. As a result, items Q1, Q2, Q5, Q6, and Q7 remain in the local database 76 of the PSC 70.

In accordance with an important aspect of the invention, the PSC 70 keeps only the current state of each data item in the database. The PSC does not record the history of its database by maintaining a separate list of write operations it has performed, such as the numbered sequence shown in FIG. 4, which is shown only for illustration purposes. Nevertheless, the PSC 70 does keep the sequence number of the last write operation applied to an existing data item by including the sequence number in the data item.

As described above, one of the write operations is the DELETE operation. Since a deleted item is removed from the local database of the server, the sequence number of the DELETE operation will be lost unless a "tombstone" is maintained to memorialize the deletion. The term "tombstone" as used herein means broadly any record maintained for keeping track of the deletion of a data item by a server. The importance of maintaining tombstones for deleted items for data replication purposes will be described in greater detail below.

In a preferred embodiment, the tombstones are in the form of a deletion table, and each server maintains a separate deletion table to keep track of data items deleted from its local database. The deleted data items may be the server's own data items or a replica of data items owned by another server. In the deletion table 120, as illustrated in FIG. 5, each entry (row) contains data regarding the deletion of one data item, including a guidMasterId field containing a globally unique identification number (GUID) of the owner of the deleted data item, the sequence number SN of the delete operation performed by the owner, a guidObject field which contains a GUID of the MQ object represented by the data item, and a Time_Stamp field indicating the time when the item is deleted from the local database of the server. Other properties of the deleted item may also be included in the deletion table.

To enable other servers to replicate the changes it has made, each PSC (or the PEC) sends replication information to other PSCs in the MQ Enterprise and BSCs in its own Site. In the context of data replication, a server which sends or forwards replication information to other servers is referred to as the "master," and a server receiving the replication information is referred to as the "slave." The replication information is included in one or more replication message packets sent from the master server to the slave server. In a preferred embodiment, the replication message packets are transmitted in direct sessions between the servers. To that end, every two PSCs in the MQIS have to be on a Connected Network, and the PSC of a Site have to be able to form a direct session with the BSCs in its Sites.

When a slave server receives a replication packet (or a synchronization reply described in greater detail below), it scans the replication data included in the packet. If it determines that the replication data are complete, it modifies its own replica according to the replication data in the packet and updates a variable to indicate the last sequence number of the particular owner that has been replicated by the slave server. If the slave server is a PSC, it forwards the replication data to the BSCs in its Site so that the BSCs can apply the changes to their replicas of the data items maintained by the PSC. In this replication process between the PSC and its BSC, the PSC is the "master" and the BSC is the "slave."

Instead of sending one replication packet each time it modifies its local database, a PSC sends replication packets to each of it slaves at fixed intervals, such as every 10 seconds across Sites (e.g., one PSC to another PSC) and every 2 seconds within its Site (i.e., a PSC to the BSCs in its Site). When a PSC performs a write operation on its own data or replicates a change to its replica of the data of another owner, it prepares in the memory an update data structure which forms the building block of replication packets. The PSC keeps an update queue for each of its slave servers. The update queue consists of pointers to update data structures that are not yet replicated to the corresponding slave server. For each write operation performed on its own data, the PSC adds such a pointer to each of the update queues for the other PSCs and the update queues for its BSCs. For each replicated change to its replica of the data of another owner, the PSC adds a pointer in the update queues for its BSCs. When the time for sending replication data to a slave server comes, a master server checks the pointers in the update queue for that slave server to include the corresponding update data structures in one or more replication packets and sends the replication packets to the slave server.

Figure 6:
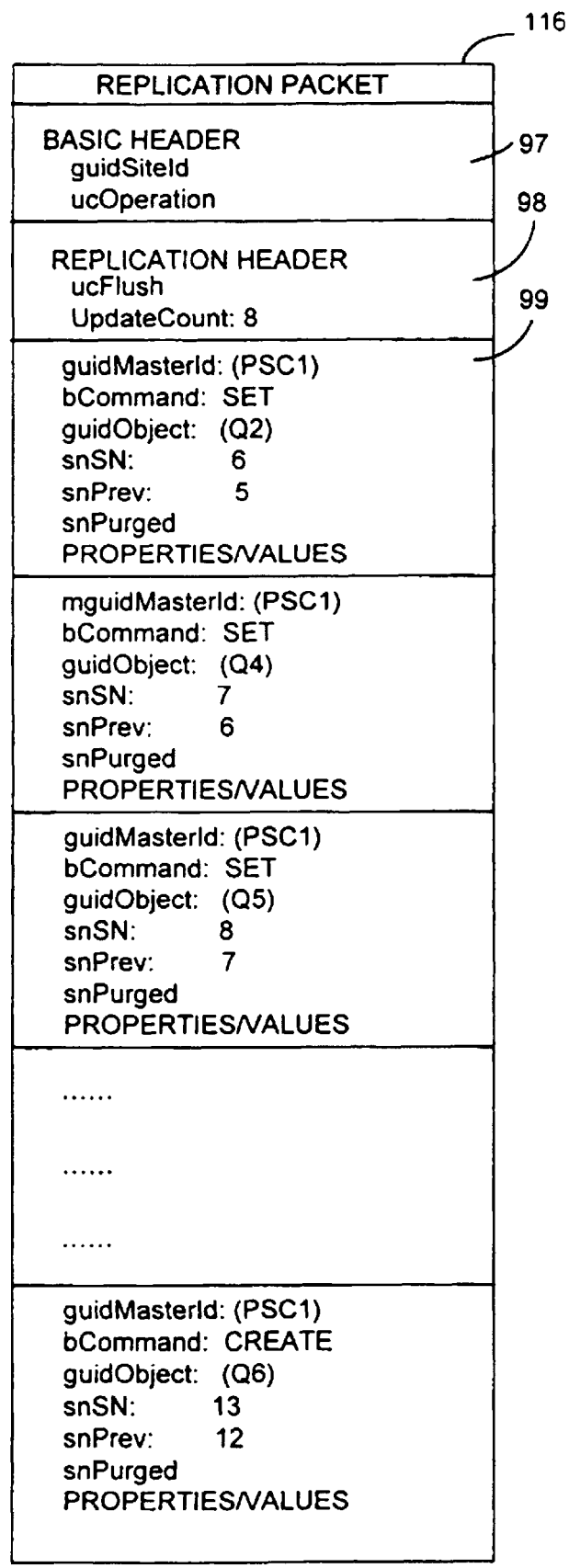
FIG. 6 is a schematic diagram showing a replication packet sent by a master server to a slave server for data replication.

The replication packet 116, as illustrated in FIG. 6, includes a basic header 97, a replication header 98, and one or more update sections 99. The basic header 97 includes a guidSiteId field which contains a GUID of the Site of the sender (which equals the guidMasterId of this Site), and an ucOperation field that identifies the type of the message (in this case a replication message).

The replication header 98 includes a ucFlush field which is a flag for indicating whether the receiver of the replication packets should forward the received packets to other servers immediately, and an UpdateCount field which contains the number of data items to be updated. The update sections 99 each contains replication data for updating one data item (which may have been created, modified, or deleted in the last replication interval). The update sections 99 are ordered by the sequence numbers of the data items. A bCommand field in each update section indicates the operation (CREATE, SET, or DELETE) applied to the data item. A guidObject field contains the GUID of the MQ object represented by the data item. A guidMasterId field identifies the owner of the data item. More specifically, for data belonging to a Site, the guidMasterId is the GUID of the Site. For data owned by the PEC, the guidMasterId is a specific number used to indicate that the owner is the PEC. A snSN field contains the sequence number of the write operation applied to the data item by the owner of the item. The update section also contains replication data regarding the properties and values of the data item. In the case of a CREATE operation, all properties and values of the created MQ object are sent. In the case of a SET operation, only the changed properties and values are sent. In the case of a DELETE operation, only the properties kept in the deletion table are sent.

Each update section also includes a snPrev field which contains the snSN of the update section before it. This field is used to indicate that there is no gap between the previous update section and the present update section. In a replication packet, the snSN values of the update sections are consecutive because each write operation by the data owner is included in the replication packet. In other words, the snPrev of an update section equals the snSN of the same update section minus one. It will be appreciated, however, that snSN values in a replication packet may not be consecutive if the data replication is implemented with scopes such that the replication data of some data items are not sent to certain slave servers. Moreover, when the same format of the update section is used in a synchronization reply as will be described below, the snSN values of the update sections may not be consecutive.

For coordinating the purging of tombstones, each slave PSC is required to acknowledge the receipt of replication packets from the master (PSC or PEC). In a preferred embodiment, a slave PSC sends an acknowledgment packet to the master when the sequence number of the master reaches a multiple of a pre-selected number, such as 256. An acknowledgment packet sent by a PSC, as illustrated in FIG. 7, includes a guidPSCMasterId identifying the master PSC server to which the acknowledgment is sent. A guidAcked-MasterId identifies the owner of the data items the acknowledgment referred to. This field is needed in the case that the master is the PEC which also serves as the PSC for its Site, where it is necessary to identify whether the data belongs to the PEC or the Site of the PEC. A SEQNUM contains the largest sequence number of the particular owner that the slave PSC acknowledges to have received. As will be described in greater detail below, a PSC or (PEC) purges a tombstone for the deletion of its own data only after receiving acknowledgments from all other PSCs for receipt of replication data including the deletion. In contrast, the BSCs in the MQIS are not required to acknowledge receipt of replication information from their PSCs. Instead, a BSC is required only to send periodically, such as every 12 hours, an acknowledgment to the PSC of its Site indicating that it is "alive."

To enable its slave servers to check whether they have missed some updates, a master PSC (or the PEC) periodically, such as once in every 20 minutes, sends out a Hello message to the slave servers. The Hello message may be a separate message packet or may piggyback on a replication packet as described above. The Hello message 106, as illustrated in FIG. 8, includes a PathName field contains the name of the master server sending the Hello packet, and a MasterCount field providing the number of data owners referred to in the Hello packet. The Hello message also includes one or more sections 107 each referring to the data items of a particular owner (Site or Enterprise). In each of the sections, a guidMasterId field contains the GUID of the data owner the section refers to. A snLSN field contains the largest sequence number of the data owner known to the master server. A snPurged field provides the sequence number up to which the master server has purged the tombstones for the deleted data items of the particular owner.

In a preferred embodiment, it is the responsibility of a slave server to ensure that it has received all replication data from a master server. When the slave server determines or suspects that it has not received all replication data from the master server, it makes a synchronization request to the master for the missing replication data. A synchronization request is triggered when a slave server receives a Hello packet and finds that the snLSN in the Hello packet for a particular owner is greater than the largest sequence number of that owner it has received. Similarly, a synchronization request may be triggered when the slave server receives a replication packet and finds a gap between the largest sequence number of the data of a particular owner in its local replica and the snPrev field of the update in the packet for that owner. In another situation, when a slave server is rebooted after being off-line for a while, it does not know whether it has missed some replication packets sent by a master server. In each of these situations, the slave server sends a synchronization request to the master server (or multiple master servers after rebooting) specifying the data owner and a range of sequence numbers of the replication data that it considers missing. In the illustrated embodiment, a BSC may send a synchronization request to its PSC. A PSC may send synchronization requests to all the other PSCs or the PEC. After sending a synchronization request, the slave server schedules to check later (e.g., after 40 min.) if the gap in the replication data as specified in the request has been closed by receiving a synchronization reply from the master. If the gap has not been closed, the slave sends a new synchronization request. The slave continues to monitor the gap and, if necessary, sends a new synchronization request until the gap is closed.

A Sync_Request packet 108 for making a synchronization request, as shown in FIG. 9, includes a guidMasterId field identifying the owner of the data items that the slave server wants to update. A snFrom field and a snTo field indicate the lower end and the upper end, respectively, of the range of sequence numbers to be synchronized. For a regular synchronization (as opposed to a full synchronization which will be described in greater detail below), the lower end is equal to the last sequence number of that owner that has been replicated by the slave server. The upper end is either the snLSN number in the Hello packet that triggered the synchronization request plus one, the snSN of the update that triggered the synchronization request, or infinity in the case that the slave server sends the synchronization request after reboot. A snKnownPurged field contains the sequence number up to which the slave server has learned that the data owner has already purged its tombstones. A ucIsFullSync flag is used to indicate whether the synchronization request is for a regular synchronization or a full synchronization.

When the master server receives a regular synchronization request, it determines whether the requested synchronization range includes the sequence number up to which it has already purged tombstones for deleted data items of the specified owner (which may be the master server or another owner). If not, the master server checks its local database to collect all existing data items and tombstones in its deletion table for that owner with sequence numbers within the requested range, and sends them to the slave server in one or more Sync_Reply packets. A Sync_Reply packet 110, as illustrated in FIG. 10, includes a guidMasterId identifying the owner of the data items involved in the synchronization. The snFrom and snTo fields indicate the range of the synchronization. A UpdateCount field indicates the number of data items included in the Sync_Reply packet. A CompleteFullSync field, which is relevant to a full synchronization operation described in greater detail below, indicates whether the full synchronization is completed, not over yet, or will be over soon. The update sections 111 in the Sync Reply packet have the same general format as the update sections in the replication packet described above. Unlike the update sections in the replication packet, however, the operation type in an update section in the Sync_Reply packet for an existing data item is indicated as "SYNC," instead of "CREATE" OR "SET," and all of the values and properties of an existing data item is included in the corresponding update section. This is done because the database does not store the type of the last write operation applied to each data item. The master server therefore cannot tell whether the last write operation is CREATE or SET. Moreover, since more than one write operations may have been performed on a data item and the database keeps only the sequence number of the last operation on the item, the snSN values of the update sections in the Sync_Reply packet may not be consecutive. In such case, the snPrev field in an update section, which contains the snSN of the previous update section, enables a slave server receiving the packet to verify that there is no gap in the update sections.

As can be seen from the foregoing, tombstones for deleted data items are maintained by a master server to support replication of deletion of data items. After a data item is deleted from the local database of the master server, a tombstone is set up to retain the sequence number of the deletion so that the master can include the deletion in Sync_Reply packets sent to its slave servers. Once the tombstone is purged, the master server no longer has information regarding the deleted item, as if that data item had never existed. If a slave server sends to the master server a synchronization request for a range of sequence numbers that includes the deletion after the tombstone is already purged by the master, the master server will not be able to include the deletion in the Sync_Reply packets. As a result, the slave server may keep a copy of the deleted data item indefinitely even though that item has already been deleted by the master server. Thus, the regular synchronization mechanism described above cannot operate properly if tombstones are purged prematurely.

As more and more tombstones are set up in the MQIS, however, they take up a significant portion of the available memory space of the replicated database. For each deleted item, there are multiple tombstones set up for its deletion. This is because each server having a copy of that data item has to set up a tombstone when it deletes that copy. By way of example, referring to FIG. 3, when the PSC 70 deletes the data item Q3 (sequence number 11 in FIG. 4), it enters a deletion record (tombstone) in its deletion table 114. As will be described in greater detail below, the tombstone in the deletion table 114 for Q3 has already been purged by the PSC 70 and is therefore not shown in FIG. 3. Replication data for sequence numbers 6–13 (FIG. 4), including the deletion of Q3, are included in the replication packet 116 sent to the PSC 66. When the slave PSC 66 receives the packet 116, it deletes its copy of the item Q3 from its local database, sets up a S tombstone 118 in its deletion table 120, and forwards the replication data in a packet 117 to the BSC 67 in its Site. When the BSC 67 receives the packet 117, it deletes its copy of the item Q3 in its database and again sets up a tombstone 122 in its deletion table 124.

To prevent uncontrolled proliferation of tombstones in the MQIS, the tombstones ultimately have to be purged by the servers from their respective local databases. To this end, it is important to determine when a tombstone should be purged. If tombstones are not promptly purged, they can take up too much of the valuable memory space of the database. On the other hand, purging tombstones prematurely will defeat the purpose of setting them up in the first place, which is to maintain information of the deletion to support synchronization.

In accordance with the invention, a method and system for purging tombstones is provided that strikes a balance between the need to purge tombstones promptly to free up memory space and the need to maintain tombstones sufficiently long to support replication and synchronization operations. The timing for purging a tombstone by a master server from its database depends on the types of slave servers to which replication information regarding the deletion is sent. For a slave server of a first type, the master server deletes the tombstone only after the slave server has acknowledged the receipt of the replication data regarding the deletion. For a slave server of a second type, the master deletes a tombstone after the tombstone has become sufficiently aged, with the presumption that the slave server is highly likely to have received the replication data regarding the deletion. If the slave server fails to receive the replication data and later requests for a synchronization when the tombstone is already purged by the master server, the master server cooperates with the slave server to perform a "full synchronization" to reconstruct for the slave server a complete and up-to-date copy of data items of the particular owner maintained in the master's database. As part of the full synchronization process, data items already deleted from the master's database are also identified and deleted from the slave's database.

In a preferred embodiment, the age of a tombstone is indicated by both its sequence number and its time stamp. More specifically, a tombstone is considered sufficiently aged for purging purposes if the sequence number of the deletion is smaller than the largest known sequence number of the data owner by a pre-selected buffer number and if a pre-selected grace period after the deletion has expired.

By way of example, in the illustrated embodiment of FIG. 3, the PSC server 70, which is the owner of the deleted data item Q3, purges the tombstone for Q3 only after it has received an acknowledgment for receiving replication data including the deletion of Q3 from each of the other PSCs in the MQ Enterprise, including the PSC 66. The acknowledgment of receipt of the replication data regarding a deletion may be explicit or implicit. For example, in the illustrated embodiment, the PSC server 70 receives an acknowledgment 126 from the PSC 66 for receipt of replication data up to a sequence number 13, which implies that the server 66 has received the replication data regarding the deletion, which has a sequence number 11.

In contrast, the PSC 70 does not wait for an acknowledgment regarding the deletion from the BSC 72 in its Site 74, and the BSC 72 is not required to send an acknowledgment about receiving the replication data. The PSC 70 purges the tombstone for Q3 if it has received acknowledgments from all other PSCs regarding that deletion and if it determines that the tombstone has become sufficiently old as indicated by its sequence number and its time stamp in the purge table. If the BSC 72 somehow fails to receive the replication information and later requests for synchronization for sequence numbers including the deletion of Q3 after the master PSC 70 has already purges the tombstone for Q3, the master server cooperates with the slave server to perform a full synchronization to construct a fresh copy of the data in the master PSC's database for the BSC.

This purging scheme provides efficient purging of tombstones while keeping the probability of the need for full synchronization low. The identification of the need for full synchronization and the performance of the full synchronization are automated. Moreover, as will be described in greater detail below, the servers are fully operational during the full synchronization and the cost of the full synchronization is reasonable. In the illustrated embodiment, the PSCs in the MQIS are likely to be connected by slow and expensive connections. It is therefore more costly to perform a full synchronization between two PSCS, which may require a transfer of a copy of all data items in the master's database to the slave. Since a master PSC purges a tombstone only after all other PSCs have acknowledged their awareness of the deletion, the costly fully synchronization between two PSCs is avoided. On the other hand, a PSC, being the main directory server and the owner of date items for the MQ objects in its Site, is expected to be in operation nearly at all times. A slave PSC should therefore be able to acknowledge the receipt of replication data without excessive delay.

In contrast, the connection between a PSC and a BSC in its Site is typically fast and less expensive, but the BSC may go off-line at random intervals. If an acknowledgment from each BSC in the Enterprise is required before purging a tombstone, one offline BSC may prevent all the other servers in the Enterprise from purging their tombstones. Thus, when the slave server is a BSC, the cost of delaying the purging of a tombstone indefinitely to wait for an acknowledgment is likely to outweigh the cost of the relatively rare event of performing a full synchronization operation.

For coordinating the purge operations by different servers in the system, each server (PEC, PSC or BSC) in the MQIS maintains a purge table: The purge table 128, as illustrated in FIG. 11, has multiple fields including snAcked, snAckedPEC, guidMasterId, snPurged, snMasterPurged, and SYNC_STATE. For each data owner (Site or PEC) in the MQ Enterprise, there is a corresponding entry in the purge table. The guidMasterId field in the entry contains the GUID of the data owner. If the entry is for a data owner other than the server maintaining the purge table, the snMasterPurged field contains the sequence number up to which the server maintaining the table knows that the owner has purged the tombstones, and the server maintaining the table is not allowed to purge beyond this number. This number prevents a slave from purging faster than its master. As described above, this number may be included in the snPurged field in the Hello packet sent out by a master server to its slave servers. The snPurged field contains the sequence number up to which the server maintaining the purge table (as opposed to the data owner) has purged tombstones for data items owned by the PSC (or PEC) to which the table entry pertains. The snAcked field is maintained by a PSC to keep track of acknowledgments from other (slave) PSCs regarding replication of its data. Similarly, the PEC (and only the PEC) maintains the columns of snAckedPEC to keep track of acknowledgments from the PSCs about data it owns as the PEC. The SYNC_STATE field, as will be described in greater detail below, is used by a slave server to indicate its status during a full synchronization operation with the master server to which the purge table entry pertains.

Each PSC also maintains a BSC_ACK table besides the purge table. Each row of the BSC_ACK table stands for a BSC in the Site of the PSC. The table has two columns: guidBSCId and BSCAckTime. The guidBSCId field contains the GUID of the BSC, and the BSCAckTime field indicates the last time the BSC has acknowledged that it is "alive."

Figure 12:
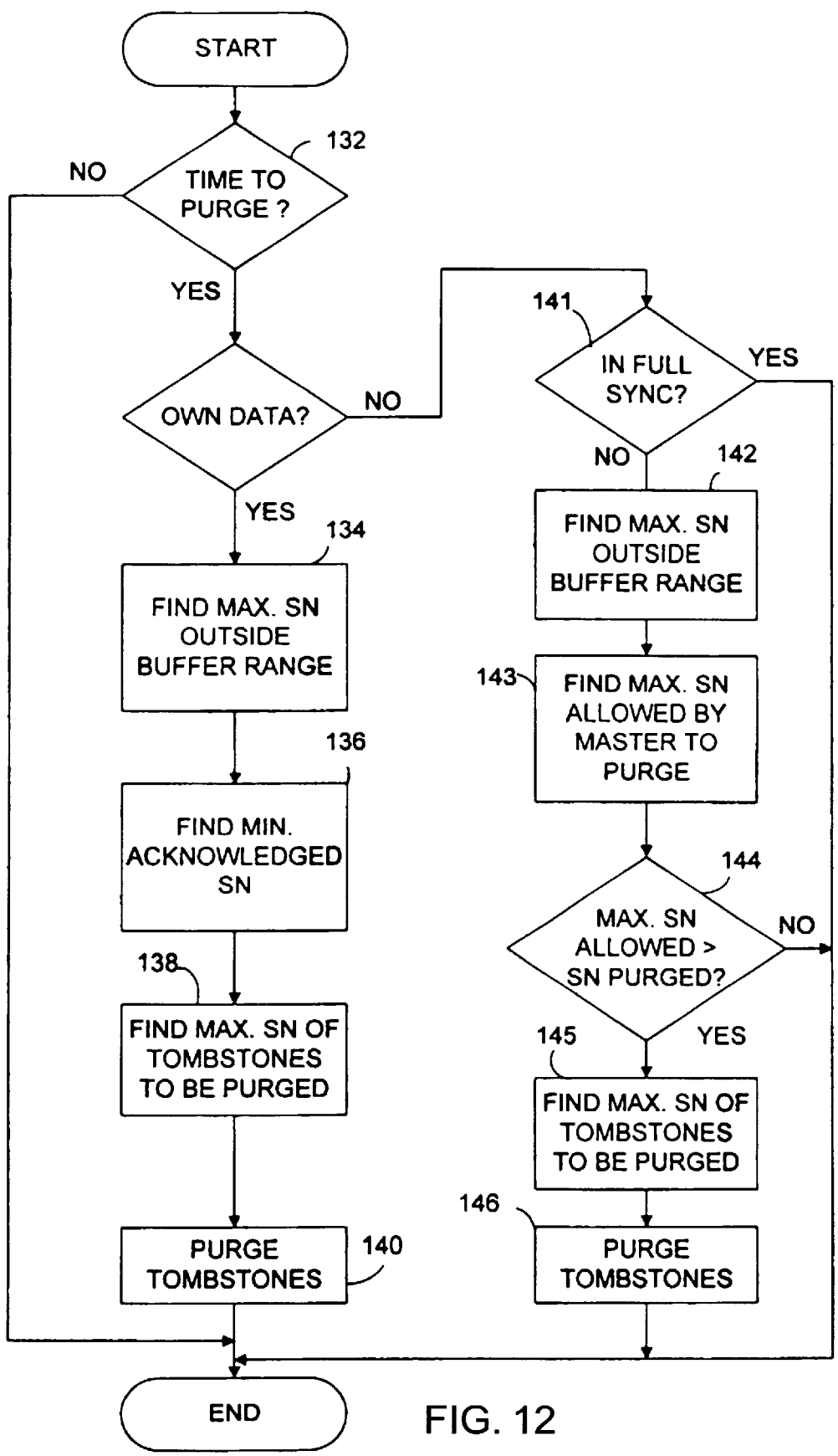
FIG. 12 is a flow diagram showing a process of purging tombstones by a server in a replicated database according to the invention.

Referring to FIG. 12, in a preferred embodiment, each server (PEC, PSC, or BSC) periodically determines whether to purge tombstones for data items owned by a particular owner, which may be itself or another server (step 132). The purge operation is triggered when the sequence number of the data of the given owner in the database of the server performing the purge has reached a multiple of a given number, such as 1024.

When the time comes for a server (PSC or PEC) to purge the tombstones for its own data items, the server calculates a variable "snPurge" (step 134) as:

snPurge=LSN−Buffer, where LSN is the sequence number of the last write operation performed by the server on its data, and BUFFER is an integer number, such as 1024. The number snPurge, which represents the largest sequence number that is not within a buffer range defined by Buffer from LSN, forms one of the upper limits of the sequence numbers of tombstones that may be purged. The value of BUFFER is selected to be sufficiently large such that sufficient tombstones are maintained to enable the master to respond to most regular synchronization requests from its slave BSC servers.

The server then looks for the smallest sequence number in the snAcked column in its purge table (step 136). This number, designated "snMinAcked," is the smallest sequence number acknowledged by other PSCs and is used as another upper limit of the sequence numbers of the tombstones the server can purge. While searching for snMinAcked, for each slave PSC that did not acknowledge up to "snPurge," the server issues an event log warning that identifies the slave server, the sequence number (snAcked) acknowledged by the slave server, and the sequence number (snPurge) up to which the master server wants to purge.

Another number, "snNewPurge," is then determined as the maximum sequence number of the records (tombstones) in the deletion table (FIG. 5) for the server's deleted data items that is less than or equal to the smaller of snPurge and snMinAcked and has a time stamp less than or equal to the current time minus T (step 138), where T is the pre-selected grace period, such as 7 days. The length of the grace period T is selected such that any on-line BSC is highly likely to receive the replication data regarding the deletion within the grace period, and any off-line BSC is highly likely to be back in operation and obtain the replication data regarding the deletion through regular synchronization operations within the grace period. The server then deletes all records in the deletion table for its data that have sequence numbers less than or equal to snNewPurge (step 140). In effect, the server determines whether a tombstone should be purged according to whether the following expression is true:

SN_tombstone<min((LSN−BUFFER), snMinAcked) & older than T

For data items owned by another server (PSC or PEC), a server performing the purge operation checks whether it is in the middle of a full synchronization as a slave with respect to the data owner (step 141). If so, the purge is not performed. Otherwise the server calculates snPurge as the current sequence number minus BUFFER (step 142) and uses it as one of the upper limits for purging the tombstones. Another upper limit is defined by a number snAllowedPurge which equals to the number snMasterPurged for the data owner in the purge table (step 143). This number prevents the slave from purging more than the master has done. The number snAlreadyPurged for the same owner in the purge table indicates the sequence number up to which the server performing the purge has already purged before. If snAllowedPurge is the same as snAlreadyPurged, there is no further purging to be done (step 144). Otherwise a number snNewPurge is determined as the maximum sequence number of the records (tombstones) in the deletion table (FIG. 5) for the server that is less than or equal to the smaller of snPurge and snAllowedPurge and has a time stamp less than or equal to the current time minus the grace period T (step 145). The server then deletes all records in the deletion table for the particular owner's data that have sequence numbers less than or equal to snNewPurge (step 146). In effect, the server determines whether to purge a tombstone for the data of another server according to whether the following expression is true:

$$SN\_tombstone < min((LSN-BUFFER), snAllowedPurge)\ \&\ older\ T$$

In both cases (with the server purging the tombstones being the owner and not the owner) described above, if the server is a PSC, it checks whether its BSCs have sent in acknowledgments that they are alive within a pre-selected time-out period. If a BSC has failed to do so, the PSC issues an event log warning indicating the name of the BSC and that the BSC did not send an acknowledgment. The time-out period is preferably shorter than the grace period to give the BSC an opportunity to be put back on-line before the tombstone is purged so that the BSC may obtain the replication data through a regular synchronization operation instead of the more expensive full synchronization operation. The failure of the BSC to acknowledge, however, does not prevent the server from purging the tombstones.

Figure 13:
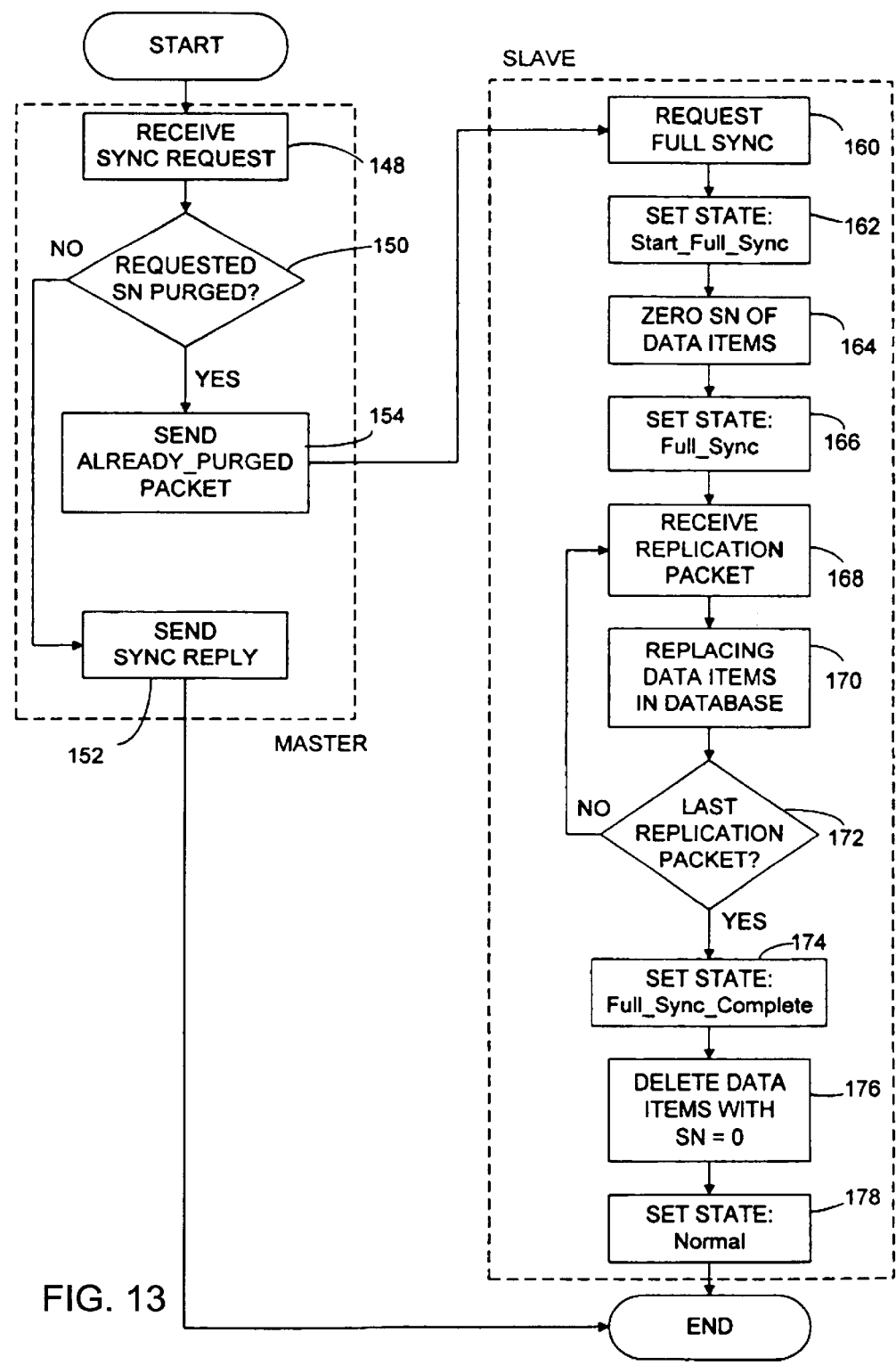
FIG. 13 is a flow diagram showing steps of a full synchronization process between two servers.

Referring now to FIG. 13, when a master server (PEC or PSC) receives a regular synchronization request from a slave server (which may be a PSC or BSC) for data items of a particular owner (step 148), it checks the requested range of sequence numbers. If the master has not yet purged any tombstone in the requested range of sequence numbers, it puts replication data for the requested range in one or more Sync_Reply packets and sends the packets to the slave (step 152). On the other hand, if the requested sequence number range includes the sequence number (snPurged) up to which the master server has purged the tombstones (step 150), the master server will not be able to respond to the synchronization request because it no longer knows whether there are deletions before snPurged. For example, referring to FIG. 3, if the BSC server 72 fails to receive the replication packet 107 regarding sequence numbers 6–13 but later receives the replication packet regarding sequence numbers 14 to 17, it sends a synchronization request to the PSC 70 for replication data for sequence numbers 6 to 13. Since the PSC 70 has already purged the tombstone for the deletion of Q3 (sequence number 11), it will be unable to perform the regular synchronization.

If the master server finds that the requested range of sequence numbers in a synchronization request overlaps the sequence numbers of tombstone it has already purged, it sends to the slave server an ALREADY_PURGED packet (step 154), which includes the GUID of the owner of the requested data and the sequence number(snPurged) up to which it has purged. In response, the slave server sends to the master server a full synchronization request packet which has the same format as the synchronization request illustrated in FIG. 9 but with the ucIsFullSync flag set to indicate that a full synchronization is requested. The lower end of the requested sequence number range is typically set to zero and the upper end set to infinity for a full synchronization request. After sending the full synchronization request, the slave server periodically checks to see whether the full synchronization is completed. If not, the slave server sends another full synchronization request with the lower end reset according to the extent to which the full synchronization has been performed.

As mentioned above, the SYNC_STATE field in the purge table indicates the status of the full synchronization operation. In an embodiment described below, the SYNC_STATE may be in one of four state: Normal, Start_Full_Sync, Full_Sync, Full_Sync_Complete. The Normal state means that the slave server is not in the process of a full synchronization. This field is maintained to provide persistency (i.e., the capability to recover from crash) of the full synchronization operation, which may take a long time to complete. If the slave server crashes in the middle of the full synchronization, when rebooted it checks the SYNC_STATE field to find out its state before the crash, and continues the full synchronization by resuming the full synchronization steps for that given state.

In accordance with a feature of a preferred embodiment, the full synchronization is performed in such a way that enables the slave server to continue to serve read requests for the data items involved in the full synchronization. In conjunction with sending the full synchronization request (step 160), the slave server changes the SYNC_STATE field for the entry corresponding to the owner of the data items to Start_Full_Sync (step 162), and changes the sequence numbers of all data items of that data owner in the slave server's database to zero (step 164). It then changes the SYNC_STATE in the purge table for the data owner to Full_Sync to indicate that the full synchronization is in progress (step 166). Because the data items are still maintained in the local database of the slave server with their respective GUIDs, the slave server can continue to serve read requests for data items of the particular owner during the relatively long period that a full sync operation lasts.

When the master server receives the full synchronization request, it sends all data items of the specific owner in its own database to the slave server in a plurality of Sync_Reply packets. The full properties and values of each existing data item, including its sequence number, are sent to the slave server. When the slave server receives the replication packets (step 168), it stores the received data items and replaces the existing data items in its database with the newly received data items with the same GUIDs (step 170). When the master server has included in a Sync_Reply packet the data item with the largest sequence number, it indicates in the packet that the full synchronization is complete. After receiving the last Sync_Reply packet (step 172), the slave changes the SYNC_STATUS to Full_Sync_Complete (step 174). At this time, any data item in the slave's database that is received from the master server during the full synchronization has a non-zero sequence number. The remaining data items with a zero sequence number are those that are not found in the master's database, i.e., they have already been deleted by the master server. The slave server then deletes the data items with a zero sequence number from its database (step 176), and sets the SYNC_STATE back to Normal (step 178).

In an alternative embodiment, the slave does not set the sequence numbers of the data items to be synchronized to zero. When the master server receives the full synchronization request, instead of sending all data items of the specified owner to the slave server, the master sends only a sorted list of the GUIDs of the data items along with their respective sequence numbers. After receiving the sorted list, the slave server compares the list against a sorted list of the GUIDs of the data items in its own database. If the GUID of an item is found on the slave's list but not on the master's list, that item has been deleted by the master and should also be deleted from the slave's database. If the GUID of an item is on both lists but with different sequence numbers on the lists, that item has to be changed by the master but is not yet updated by the slave. During the comparison, the slave deletes all data items in its database that are not on the master's list and then sends a request for a list of items to be updated, and the master in response sends replication packets with only those specifically identified items to the slave server. Since the slave server maintains a copy of the data items during the full synchronization operation, it can continue to serve read requests for the data items.

The foregoing shows that the present invention provides an effective method and system for purging tombstones for deleted data items in a replicated database. For slave servers with slow connections to a master server, the master server purges a tombstone only after the slave servers have acknowledged receiving the replication data for the deletion. For slave servers with fast connections to the master but unpredictable downtimes, the master server purges the tombstone after the tombstone has sufficiently aged. In the event that a slave server requests for replication data and the master has already purged tombstones up to the requested range of data, the slave server initiates a full synchronization with the master to obtain a fresh copy of the data of the master. This approach allows efficient use of system resources by avoiding delay caused by waiting for acknowledges from servers with unpredictable downtimes while avoiding the cost of performing full synchronization over slaw connections.

What is claimed is:

1. A method of purging tombstones for memorializing deleted data items in a replicated database in which a slave server maintains a replica of data items stored by a master server, comprising the steps of:

performing a deletion by a master server to delete a data item stored by the master server;

setting up by the master server a tombstone for the deleted data item;

transmitting, from the master server to the slave server, a replication packet containing replication data regarding the deletion; and purging, by the master server, the tombstone for the deleted data item after an age of the tombstone has reached a pre-selected threshold.

2. A method as in claim 1, wherein the age of the tombstone is indicated by a time stamp of the tombstone and an operation sequence number of the tombstone.

3. A method as in claim 1, further including the step of sending a message from the master server to the slave server indicating an extent to which the master server has purged tombstones for data items deleted by the master server.

4. A method as in claim 1, further including the step of assigning an operation sequence number to the deletion of the data item for identification thereof, and wherein the replication data includes the operation sequence number of the deletion.

5. A method as in claim 1, further including the steps of:

transmitting, from the slave server to the master server, a synchronization request for information for updating the replica maintained by the slave server;

determining, by the master server, whether the synchronization request specifies an update range that covers the deletion of the data item and the tombstone for the deleted data item is purged by the master server; and performing a full synchronization to reconstruct the replica of the slave server to match the data items stored by the master server when the update range specified in the synchronization request covers the deletion of the data item and the tombstone for the deleted data item is purged by the master server.

6. A method as in claim 5, wherein the step of performing the full synchronization includes retaining by the slave server the replica of data items during the full synchronization to allow the slave server to serve read requests for said replica of data items.

7. A method as in claim 6, wherein each data item has an operation sequence number associated therewith, and wherein the step of performing the full synchronization includes:

setting operation sequence numbers of data items of the replica maintained by the slave server to zero;

transmitting, from the master server to the slave server, replication data regarding the data items stored by the master server;

reconstructing the replica of the slave server according to the replication data regarding the data items stored by the master server; and deleting, after the reconstructing, data items of the replica with a zero sequence.

8. A computer-readable medium having computer executable instructions for performing the steps recited in claim 7.

9. A method as in claim 6, wherein each data item has a unique identification number and an operation sequence number associated therewith, and wherein the step of performing the full synchronization includes:

sending from the master server to the slave server a sorted list of the unique identification numbers of data items stored by the master server and the associated operation sequence numbers thereof;

comparing, by the slave server, the sorted list sent by the master with a sorted list of unique identification numbers of data items in the replica of the slave server with associated operation sequence numbers thereof to identify data items in the replica that are not on the sorted list of the master server and data items in the replica that are on both the sorted lists of the master server and the slave server but have different associated operation sequence numbers on the two sorted lists; and deleting from the replica the data items not on the sorted list of the master server;

sending a request from the slave server to the master server for data items that are on both sorted lists but with different associated operation sequence numbers on the two sorted lists.

10. The method of claim 1, further including the steps of:

transmitting replication data regarding the deletion to a second slave server which maintains a second replica of the data items of the master server;

awaiting, by the master server, an acknowledgment from the second slayer server of receipt of the replication data before purging the tombstone for the deleted data item.

11. A method of purging tombstones for memorializing deleted data items in a replicated database having first, second, and third servers each having a local database and the second and third servers each maintaining a replica of data items maintained by the first server, comprising the steps of:

performing a deletion by the first server to delete a data item from the local database of the first server;

setting up by the first server a first tombstone for the data item deleted by the first server;

transmitting, from the first server to the second server, a first replication packet containing replication data regarding the data item deleted by the first server;

transmitting, from the first server to the third server, a second replication packet containing replication data regarding the data item deleted by the first server;

receiving an acknowledgement from the second server to the first server regarding receipt of the first replication packet; and purging, by the first server, the first tombstone after receiving the acknowledgement from the second server and after an age of the first tombstone has reached a pre-selected threshold.

12. A method as in claim 11, wherein the age of the first tombstone depends on a time stamp and an operation sequence number of the tombstone.

13. A method as in claim 11, further including the steps of:

deleting, by the second server, the data item deleted by the first server from the replica maintained by the second server upon receiving the first replication packet;

setting up by the second server a second tombstone for deletion of the data item from the replica of the second server; and sending, by the second server, a third replication packet containing replication data regarding the deleted data item to a fourth server of the replicated database, the fourth server maintaining a replica of data items maintained by the second server.

14. A method as in claim 13, further including the step of purging, by the second server, the second tombstone after the first server has purged the first tombstone and after an age of the second tombstone has reached the pre-selected threshold.

15. A method as in claim 11, further including the steps of:

transmitting, from the third server to the first server, a synchronization request for information for updating the replica of the third server;

determining, by the first server, whether the synchronization request specifies an update range that covers the deletion of the data item and the first tombstone is purged by the first server; and performing a full synchronization to reconstruct the replica of the third server to match the data items of the first server when the update range specified in the synchronization request covers the deletion of the data item and the first tombstone is purged by the first server.

16. A computer-readable medium having computer executable instructions for performing the steps recited in claim 15.

17. A replicated database system comprising:

a first server having a first database for storing data items, a deletion table for storing deletion records for data items deleted by the first server from the first database, and a purge table for storing data regarding purge operations performed by the first server on the deletion records in the deletion table, each deletion record in the deletion table having a time stamp for deletion of a corresponding data item, the purge table including a field indicating an extent to which the first server has purged the deletion records in the deletion table; and a second server having a second database for maintaining a replica of the data items stored in the first database, the first server programmed to place a deletion record in the deletion table for a data item deleted from the first database, send replication data regarding the deleted data item to the second server for updating the replica maintained by the second server, and purge the deletion record after the deletion record has reached a pre-selected age.

18. A replicated database system as in claim 17, further including a third server having a third database for maintaining a replica of the data items stored in the first database, and wherein the first server programmed to purge the deletion record for the deleted data item after receiving an acknowledgment from the third server for receiving replication data sent by the first server regarding the deletion of the deleted data item.

19. A computer-readable medium having stored thereon a data structure comprising:

a first data field containing data representing an identification number identifying a data owner in a replicated database, the data owner owning data items each having an operation sequence number associated therewith; and a second data field containing data representing a purged sequence number identifying an operation sequence number up to which a server in the replicated database maintaining said data structure has purged tombstones set up for data items owned by said data owner and deleted by the server.

20. A computer-readable medium having stored thereon a data structure comprising:

a first data field containing a unique identification number of a data item deleted from a local database of a server in a replicated database;

a second data field containing a sequence number associated with the deletion of the data item from the local database;

a third data field containing a time stamp indicating a time of the deletion of the data item, and a fourth data field containing a unique identification number for an owner of the deleted data item.

21. A computer-readable medium having computer-executable instructions for performing steps comprising:

performing a deletion by a master server in a replicated database to delete a data item stored by the master server;

setting up by the master server a tombstone for the deleted data item;

transmitting, from the master server to a slave server in the replicated database, a replication packet containing replication data regarding the deletion, the slave server maintaining a replica of the data items stored by the master server; and purging, by the master server, the tombstone for the deleted data item after an age of the tombstone has reached a pre-selected threshold.

22. A computer-readable medium having computer-executable instructions for performing steps comprising:

performing a deletion by a first server in a replicated database to delete a data item from a local database of the first server;

setting up by the first server a first tombstone for the data item deleted by the first server;

transmitting, from the first server to a second server in the replicated database, a first replication packet containing replication data regarding the data item deleted by the first server, the second server maintaining a replica of data items in the local database of the first server;

transmitting, from the first server to the third server in the replicated database, a second replication packet containing replication data regarding the data item deleted by the first server, the third server maintaining a replica of data items in the local database of the first server;

sending an acknowledgment from the second server to the first server regarding receipt of the first replication packet; and purging, by the first server, the first tombstone after receiving the acknowledgment from the second server and after an age of the first tombstone has reached a pre-selected threshold.

* * * * *

UNITED STATES PATENT AND TRADEMARK OFFICE
CERTIFICATE OF CORRECTION

PATENT NO.    : 6,256,634 B1
DATED         : July 3, 2001
INVENTOR(S)   : Moshaiov et al.

It is certified that error appears in the above-identified patent and that said Letters Patent is hereby corrected as shown below:

Title page,
Item [56], References Cited, U.S. PATENT DOCUMENTS, the following citations are added:
-- 5,793,861    8/1998     Haigh.
   5,546,391    8/1996     Hochschild et al.
   5,193,090    3/1993     Filipiak et al.
   5,930,479    7/1999     Hall.
   4,656,474    4/1987     Mollier et al.
   5,878,056    3/1999     Black et al..
   5,465,328    11/1995    Dievendorff et al.
   5,555,415    9/1996     Allen.
   5,627,766    9/1996     Beaven.
   5,828,653    10/1998    Goss. --
OTHER PUBLICATIONS,
-- Lam, Richard B., "Shared Memory and Message Queues", Dr. Dobb's Journal on CD-Rom, March 1995 pg. 2-3. --
Newton, Harry, Newton's Telecomm Dictionary, 8$^{th}$ Ed, Flatiron Publishing, 1994, pp. 333 and 870. --

Signed and Sealed this

Fourth Day of May, 2004

JON W. DUDAS
*Acting Director of the United States Patent and Trademark Office*